(12) United States Patent
Wang et al.

(10) Patent No.: US 12,409,594 B2
(45) Date of Patent: Sep. 9, 2025

(54) AUTOMATIC FORMING METHOD AND DEVICE FOR A RUBBER SEALING RING BLANK

(71) Applicant: CHENGDU HOLY AVIATION SCIENCE TECHNOLOGY CO., LTD., Chengdu (CN)

(72) Inventors: Liang Wang, Chengdu (CN); Hongzhong Tu, Chengdu (CN); Jie Zhong, Chengdu (CN); Chen Han, Chengdu (CN); Junjie Li, Chengdu (CN); Xiaofeng Zhang, Chengdu (CN); Zhulin Xu, Chengdu (CN); Wenfeng Wu, Chengdu (CN); Yanhui Chen, Chengdu (CN); Xuanmin Huang, Chengdu (CN); Xi Ling, Chengdu (CN); Shixiang Gan, Chengdu (CN); Donghui Li, Chengdu (CN); Jiajun Xie, Chengdu (CN); Qingbo Zheng, Chengdu (CN); Dongliang Ding, Chengdu (CN); Shipu Guo, Chengdu (CN)

(73) Assignee: CHENGDU HOLY AVIATION SCIENCE TECHNOLOGY CO., LTD., Chengdu (CN)

( * ) Notice: Subject to any disclaimer, the term of this patent is extended or adjusted under 35 U.S.C. 154(b) by 108 days.

(21) Appl. No.: 18/123,539

(22) Filed: Mar. 20, 2023

(65) Prior Publication Data
US 2024/0009906 A1 Jan. 11, 2024

(30) Foreign Application Priority Data
Jul. 4, 2022 (CN) .......................... 202210778237.7

(51) Int. Cl.
*B29C 48/00* (2019.01)
*B29D 99/00* (2010.01)
(Continued)

(52) U.S. Cl.
CPC ...... *B29C 48/0022* (2019.02); *B29C 48/0019* (2019.02); *B29D 99/0085* (2013.01); *B29K 2021/00* (2013.01); *B29L 2031/26* (2013.01)

(58) Field of Classification Search
CPC ............ B29D 99/0082; B29D 99/0085; B29C 48/0022; B29C 69/002; B29C 69/003; B29L 2031/7096–7102; F16J 15/10
See application file for complete search history.

(56) References Cited

U.S. PATENT DOCUMENTS

| 3,466,079 A | * | 9/1969 | Mammel | ............. | H01L 21/6838 |
| | | | | | 294/64.3 |
| 2020/0055231 A1 | * | 2/2020 | Chyla | ..................... | B29C 53/36 |

FOREIGN PATENT DOCUMENTS

| CN | 107932572 A | | 4/2018 | | |
| CN | 110239127 A | * | 9/2019 | ......... | B29D 99/0085 |

(Continued)

*Primary Examiner* — Susan D Leong
*Assistant Examiner* — Vipul Malik
(74) *Attorney, Agent, or Firm* — MUNCY, GEISSLER, OLDS & LOWE, P.C.

(57) ABSTRACT

The present invention relates to the field of forming technologies for rubber sealing ring blanks, and more particularly to an automatic forming method and device for a rubber sealing ring blank. A cutting blade is fixedly connected to the surface of a blank forming assembly; an equipment body II is fixedly connected to a sliding table die set; a supporting rod II is fixedly connected to the surface of the equipment body II; a blank box is fixedly connected to the inner side surface of the supporting rod II; and a blank spool is fixedly connected to the tail end of a long blank strip. The method and device disclosed by the present invention have the (Continued)

advantages that the automation degree is high, and the long blank strip conveyed from the blank spool passes through guide wheels and a guide groove and is automatically pressed into a ring through the combined action of the blank forming assembly and the cutting blade. According to this patent technology, feeding is performed by means of continuous introduction of the blank strip; and automatic formation of the blank ring is achieved through the action of an automation assembly. Except for a process of replacing the blank spool after the long blank strip of the blank spool is used up, the other processes are all completed by the machine, such that the automation rate is high.

6 Claims, 3 Drawing Sheets

(51) Int. Cl.
  *B29K 21/00* (2006.01)
  *B29L 31/26* (2006.01)

(56) References Cited

FOREIGN PATENT DOCUMENTS

| | | | |
|---|---|---|---|
| CN | 113618994 A | | 11/2021 |
| JP | 2009269636 A | * | 11/2009 |

* cited by examiner

AUTOMATIC FORMING METHOD AND DEVICE FOR A RUBBER SEALING RING BLANK

TECHNICAL FIELD

The present invention relates to the field of forming technologies for rubber sealing ring blanks, and more particularly to an automatic forming method and device for a rubber sealing ring blank.

BACKGROUND ART

A molded vulcanization process is adopted in most of the production of rubber sealing rings to perform molded vulcanization on products according to process parameters after the produced rubber blank ring is placed behind a mold cavity. In the prior art, the forming methods, as well as advantages and disadvantages of rubber blank rings are mainly characterized in that:

1. a blank whole-ring blank forming process I, i.e., a cutting process using a cutting machine, in which a rubber blank is remelted into a thin sheet and placed on a workbench surface of the cutting machine, and the thin sheet is cut into rubber blanks of a desired size by planning a cutting path for the cutting machine; this process has the advantages of high forming speed and high forming flexibility of the blanks, and the disadvantages that remaining scraps are generally re-remelted into thin sheets and then re-cut in order to avoid wasting the remaining scraps, which will inevitably cause part of rubber to be repeatedly re-remelted, so as to affect the performances of the rubber ring;

2. a blank whole-ring forming process II, i.e., tube formation by extrusion and then ring formation by cutting, in which a rubber blank is remelted, then placed in a rubber extruder, and extruded into a tube from a mouth die of the extruder, and the extruded rubber tube is cut into a ring by a high-speed rotating cutter at tube mouth; this process has the advantages of high forming speed and stable forming, and the disadvantages that the flexibility degree is relatively low, and it is necessary to stop and replace the corresponding mouth die if rubber rings of different sizes need to be formed; and 3. a blank non-whole-ring lapping process, in which a rubber blank is remelted, then produced into thin sheets, and cut into rubber strips of a specified length by a strip cutting machine, e.g., a strip cutting method for rubber blanks provided in "Strip Cutting Machine" of Application No. CN107932572A in which a rubber blank is cut into strips which are then adhered into a ring end to end by using a chemical reagent such as ethyl acetate, and e.g., a rubber blank strip lapping method provided in "Non-whole Molded Forming Method for Blank of Rubber Sealing Ring" in Application No. CN113618994A, this method being widely applied in the industry, especially in the manufacturing industry of military rubber products; and this process has the advantages that the flexibility degree is high and the rubber strips can be lapped randomly according to a desired size of the rubber ring, and the disadvantages that (1) this process is mainly performed by manual operation, such that the forming efficiency is not high; and (2) the quality stability of the blank ring fluctuates greatly, which is easy to cause unstable thickness of a flash after the rubber ring is subjected to molded vulcanization, which in turn leads to the fluctuation in the size of the rubber ring after the molded vulcanization, resulting in potential quality hazards.

SUMMARY OF THE INVENTION

An object of the present invention is to provide an automatic forming method and device for a rubber sealing ring blank against the deficiencies of the prior art, in order to solve the problems raised in the background art.

In order to fulfill said object, the present invention provides the following technical solution: an automatic forming method and device for a rubber sealing ring blank are provided. The device includes an equipment body I, wherein a supporting rod I is fixedly connected to the surface of the equipment body I; guide wheels are fixedly connected to the surface of the equipment body I; a long blank strip is in meshed connection to the surface of the guide wheel; a guide groove is fixedly connected to the surface of the long blank strip; a blank forming assembly is fixedly connected to the surface of the long blank strip; a sliding table die set is fixedly connected to the surface of the blank forming assembly; a cutting blade is fixedly connected to the surface of the blank forming assembly; an equipment body II is fixedly connected to the sliding table die set; a supporting rod II is fixedly connected to the surface of the equipment body II; a blank box is fixedly connected to the inner side surface of the supporting rod II; and a blank spool is fixedly connected to the tail end of the long blank strip.

the blank forming assembly includes an assembly shell, wherein an assembly body is fixedly connected to the interior of the assembly shell, the surface of the assembly body is provided with assembly pore arrays, a compressed air passage is fixedly connected to the surface of the assembly shell, a compressed air connector is fixedly connected to the surface of the compressed air passage, and a rotating mechanism is fixedly connected to the surface of the compressed air passage; and the sliding table module includes a sliding sleeve module, wherein a sliding table base is fixedly connected to the surface of the sliding sleeve module, and a sliding table motor is fixedly connected to the surface of the sliding table base.

As a preferred technical solution of the present invention, the supporting rod I and the supporting rod II are identical in appearance size and length, and meanwhile, the blank box is located between the inner side surfaces of the supporting rod I and the supporting rod II. The control ability of the whole device is maximized to ensure the practicality of the whole device.

As a preferred technical solution of the present invention, the number of the guide wheels is four, which are respectively located on the upper and lower sides of the left end surface of the long blank strip, with the number of guide wheels on each side being equal. The stability of respective members is effectively enhanced, and the supporting strength for the whole device is strengthened.

As a preferred technical solution of the present invention, the guide grooves are mounted at the tail of the left surface of the long blank strip, and are on the same horizontal line as the blank forming assembly. The use of the whole device is protected better from being affected and the practicality of the operation of the whole device is strengthened.

As a preferred technical solution of the present invention, the blank forming assembly is mounted at the tail of the left surface of the long blank strip, and is on the same horizontal line as the blank spool. The balance of the whole device is strengthened better, and the flexibility of the whole device in use is effectively enhanced.

As a preferred technical solution of the present invention, an opening diameter of the blank box is less than a spacing between the supporting rod I or the blank spool, and meanwhile the blank box has the same height as the supporting rod I and the blank spool.

As a preferred technical solution of the present invention, the assembly pore arrays are distributed at equal intervals on the surface of the assembly body, and are only located in the middle position of the surface of the assembly body. The operability of the whole device is effectively enhanced to ensure the firmness and stability of the use process.

As a preferred technical solution of the present invention, the sliding sleeve module is mounted at the tail end of the right surface of the rotating mechanism, while the appearance of the sliding sleeve module is U-shaped, and in clamping connection to the outside of the surface of the rotating mechanism. The control of the staff over the whole device is maximized, the experience of the whole device in use is improved, and the difficulty of the staff's operation is reduced.

An automatic forming method for a rubber sealing ring blank, specifically comprising:
S1: remelting a rubber blank, then extruding the rubber blank into a long blank strip by a rubber extruder, and winding the long blank strip on a blank spool;
S2: dragging the long blank strip on the blank spool into the guide wheels, and controlling the guide wheels to convey the long blank strip forward;
S3: after the long blank strip is guided by the guide groove and the end of the long blank strip is adsorbed by the assembly pore arrays of the blank forming assembly in a forming area, driving by a sliding table die set to move away from an equipment body I while conveying the blank forward by the guide wheels, and meanwhile, driving a blank forming assembly by a rotating mechanism to rotate along a plane at an angle of 90 degrees with a movement direction of the sliding table die set;
S4: driving the blank forming assembly by the sliding table die set to move towards the equipment body I until the end of the long blank strip makes contact with the head of the long blank strip and is initially extruded;
S5: popping a cutting blade on the equipment body I out to cut off the long blank strip;
S6: conveying the blank backward by the guide wheels until ensuring that the blank is formed without any interference;
S7: driving the blank forming assembly by the sliding table die set to continue to extrude toward the equipment body I until the end of the long blank strip is embedded in the lower blank strip, and the thickness is twice the thickness of the blank strip, and meanwhile performing pressurized blowing on the assembly pore arrays to assisting in formation of the blank ring;
S8: driving the blank forming assembly by the sliding table die set to move away from the equipment body I, wherein the formed blank falls into the blank box under the combined action of gravity and air pressure; and
S9: resetting the rotating mechanism and the blank forming assembly, guiding the long blank strip by the guide wheels to move forward, and repeating the processes of S1 to S8 to realize continuous formation of the blank.

The present invention has the following beneficial effects.
(1) The automation degree is high. The long blank strip conveyed from the blank spool passes through the guide wheels and the guide groove and is automatically pressed into a ring through the combined action of the blank forming assembly and the cutting blade. According to this patent technology, feeding is performed by means of continuous introduction of the blank strip; and automatic formation of the blank ring is achieved through the action of an automation assembly. Except for a process of replacing the blank spool after the long blank strip of the blank spool is used up, the other processes are all completed by the machine, such that the automation rate is high.
(2) The flexibility degree is high. Rubber blank rings, especially blanks of military rubber rings, are often produced in a rubber production line or workshop, and thousands of specifications of rubber sealing rings need to be produced. The blank forming technology provided by this patent can realize the formation of blank rings with different inner diameter specifications by controlling the length of the long blank strip pulled by the guide wheels, which is equivalently converted into an inner diameter of the blank ring. After using this method, the equipment is highly versatile, and can adapt to the blank ring formation with a large inner diameter size range, without changing the mouth die.
(3) The blank utilization rate is high. According to the blank ring forming method provided by this patent, the remelted blank is extruded into the long blank strip at high pressure, and the required blank length is provided according to a product size structure. In this way, no remaining scraps is produced, such that the blank utilization rate is high.

Reference symbols represent the following components: 1—equipment body I; 2—supporting rod I; 3—guide wheel; 4—long blank strip; 5—guide groove; 6—assembly pore array; 601—assembly shell; 602—assembly body; 603—assembly pore array; 604—compressed air connector; 605—compressed air passage; 606—rotating mechanism; 7—sliding table die set; 701—sliding table module; 702—sliding table base; 703—sliding table motor; 8—cutting blade; 9—equipment body II; 10—supporting rod II; 11—blank box; 12—blank spool.

DETAILED DESCRIPTION

Figure 1:
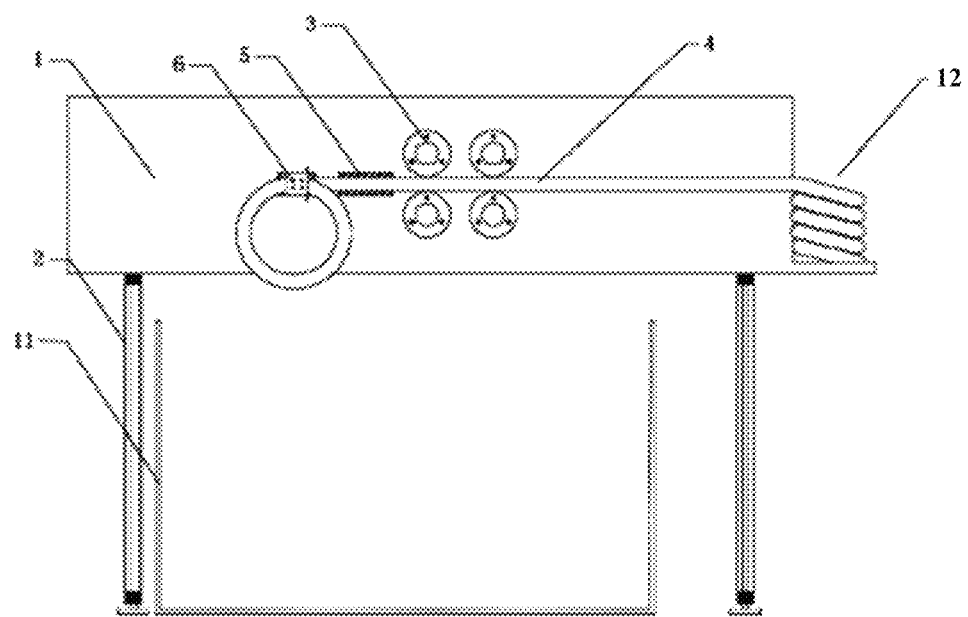
FIG. 1 is a front view of a preferred embodiment of the present invention.
Figure 2:
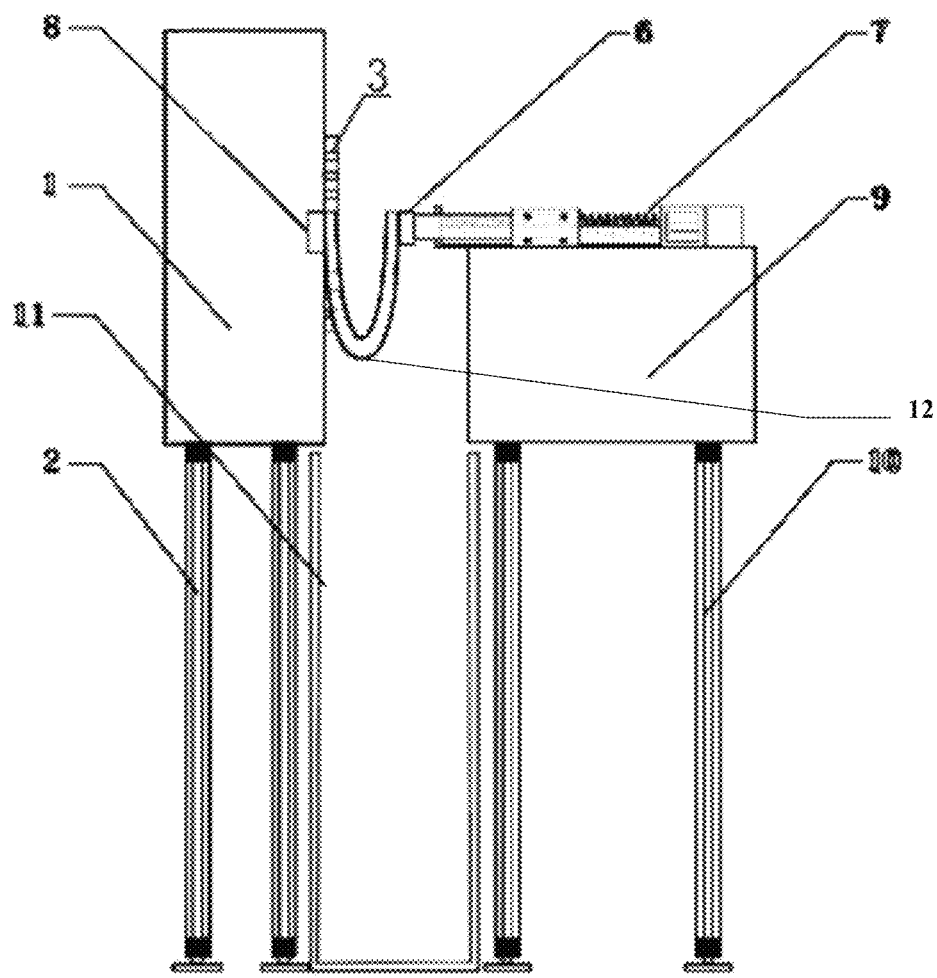
FIG. 2 is a side view of a preferred embodiment of the present invention.
Figure 3:
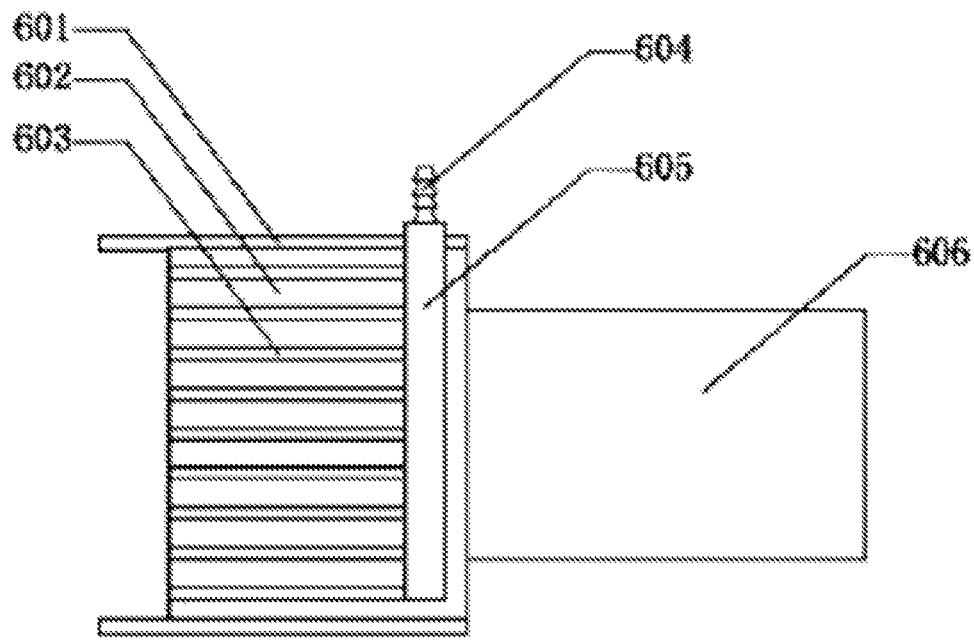
FIG. 3 is a schematic diagram of a preferred embodiment of a blank forming assembly of the present invention.
Figure 4:
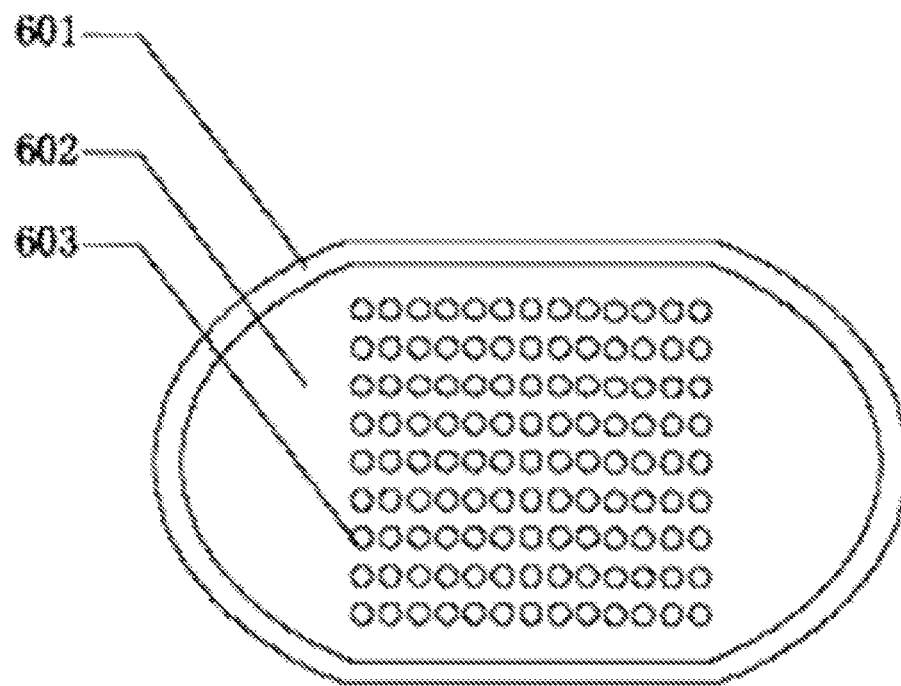
FIG. 4 is a schematic diagram of a preferred embodiment of a blank forming assembly of the present invention from another prospective.
Figure 5:
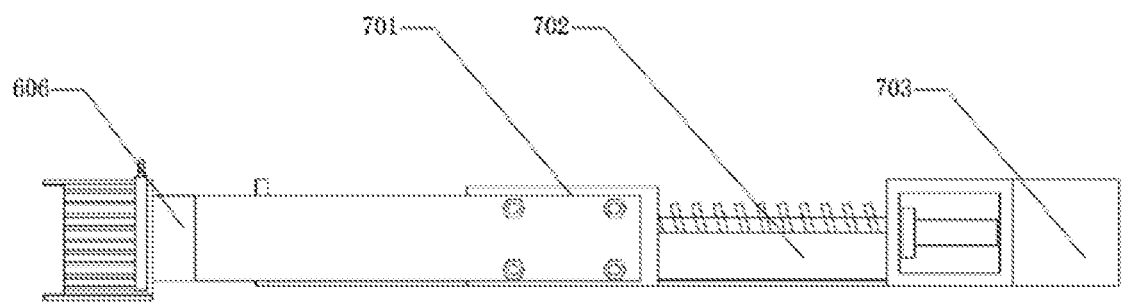
FIG. 5 is a schematic diagram of a local structure of blank formation according to a preferred embodiment of the present invention.

Referring to FIGS. 1 to 5, in this embodiment, an automatic forming method and device for a rubber sealing ring blank are provided. The automatic forming device includes an equipment body I 1, wherein a supporting rod I 2 is fixedly connected to the surface of the equipment body I 1; guide wheels 3 are fixedly connected to the surface of the equipment body I 1; a long blank strip 4 is in meshed connection to the surface of the guide wheel 3; a guide groove 5 is fixedly connected to the surface of the long blank strip 4; a blank forming assembly 6 is fixedly connected to the surface of the long blank strip 4; a sliding table die set 7 is fixedly connected to the surface of the blank forming assembly 6; a cutting blade 8 is fixedly connected to the surface of the blank forming assembly 6; an equipment body II 9 is fixedly connected to the sliding table die set 7; a supporting rod II 10 is fixedly connected to the surface of the equipment body II 9; a blank box 11 is fixedly connected to the inner side surface of the supporting rod II 2; a blank spool 12 is fixedly connected to the tail end of a long blank strip 4;

the blank forming assembly 6 includes an assembly shell 601, wherein an assembly body 602 is fixedly connected to the interior of the assembly shell 601, the surface of the assembly body 602 is provided with assembly pore arrays 603, a compressed air passage 605 is fixedly connected to the surface of the assembly shell 601, a compressed air connector 604 is fixedly connected to the compressed air passage 605, and a rotating mechanism 606 is fixedly connected to the surface of the compressed air passage 605; and the sliding table module 7 includes a sliding sleeve module 701, wherein a sliding table base 702 is fixedly connected to the surface of the sliding sleeve module 701, and a sliding table motor 703 is fixedly connected to the surface of the sliding table base 702.

In this embodiment, the supporting rod I 2 and the supporting rod II 10 are identical in appearance size and length, and meanwhile, the blank box 11 is located between the inner side surfaces of the supporting rod I 2 and the supporting rod II 10. Through the matching of the whole device in use, respective components of the whole device are run in to strengthen the coordination of the whole device in use. The number of the guide wheels 3 is four, which are respectively located on the upper and lower sides of the left end surface of the long blank strip 4, with the number of guide wheels 3 on each side being equal. The coordination strength of the whole device in use is greatly strengthened, and the asymmetry of component matching of the whole device in use is avoided. The guide grooves 5 are mounted at the tail of the left surface of the long blank strip 4, and are on the same horizontal line as the blank forming assembly 6. The whole device is supported together with the existing structure, the coordination performance of the whole device in use is strengthened, and the durability of the whole device in use is strengthened. The blank forming assembly 6 is mounted at the tail of the left surface of the long blank strip 4, and is on the same horizontal line as the blank spool 12. With the enhancement of the flexible control ability of the whole device, the probability of failure of the whole device in use is reduced. An opening diameter of the blank box 11 is less than a spacing between the supporting rod I 2 or the blank spool 12, and meanwhile the blank box 11 has the same height as the supporting rod I 2 and the blank spool 12. The flexibility of the whole device is enhanced better to ensure that it can still be used normally once installed again after disassembly. The assembly pore arrays 603 are distributed at equal intervals on the surface of the assembly body 602, and are only located in the middle position of the surface of the assembly body 602. These structures are used together for mechanical movement, thus ensuring that the whole device minimizes possible failures during operation. The sliding sleeve module 701 is mounted at the tail end of the right surface end of the rotating mechanism 606, while the appearance of the sliding sleeve module 701 is U-shaped, and in clamping connection to the outside of the surface of the rotating mechanism 606. The mechanical potential energy of the whole device during operation is greatly enhanced, and the loss of force generated by the whole device during operation is saved.

Embodiment one:

An automatic forming method and device for a rubber sealing ring blank, specifically comprising:

S1: remelting a rubber blank, then extruding the rubber blank into a long blank strip 4 by a rubber extruder, and winding the long blank strip 4 on a blank spool 12;

S2: dragging the long blank strip 4 on the blank spool 12 into the guide wheels 3, and controlling the guide wheels 3 to convey the long blank strip 4 forward;

S3: after the long blank strip 4 is guided by the guide groove 5 and the end of the long blank strip 4 is adsorbed by the assembly pore arrays 603 of the blank forming assembly 6 in a forming area, driving by a sliding table die set 7 to move away from an equipment body I 1 while conveying the blank forward by the guide wheels 3, and meanwhile, driving a blank forming assembly 6 by a rotating mechanism 606 to rotate along a plane at an angle of 90 degrees with a movement direction of the sliding table die set 7;

S4: driving the blank forming assembly 6 by the sliding table die set 7 to move towards the equipment body I 1 until the end of the long blank strip 4 makes contact with the head of the long blank strip 4 and is initially extruded;

S5: popping a cutting blade 8 on the equipment body I 1 out to cut off the long blank strip 4;

S6: conveying the blank backward by the guide wheels 3 until ensuring that the blank is formed without any interference;

S7: driving the blank forming assembly 6 by the sliding table die set 7 to continue to extrude toward the equipment body I 1 until the end of the long blank strip 4 is embedded in the lower blank strip, and the thickness is twice the thickness of the blank strip, and meanwhile performing pressurized blowing on the assembly pore arrays 603 to assisting in formation of the blank ring;

S8: driving the blank forming assembly 6 by the sliding table die set 7 to move away from the equipment body I 1, wherein the formed blank falls into the blank box 11 under the combined action of gravity and air pressure; and S9: resetting the rotating mechanism 606 and the blank forming assembly 6, guiding the long blank strip 4 by the guide wheels 3 to move forward, and repeating the processes of S1 to S8 to realize continuous formation of the blank.

The invention claimed is:

1. An automatic forming device for a rubber sealing ring blank, comprising: an equipment body I (1), wherein a supporting rod I (2) is fixedly connected to a surface of the equipment body I (1); guide wheels (3) are fixedly connected to the surface of the equipment body I (1); a blank strip (4) is in meshed connection to surface of the guide wheels (3); a guide groove (5) is fixedly connected to a surface of the blank strip (4); a blank forming assembly (6) is fixedly connected to the surface of the blank strip (4); a sliding table module (7) is fixedly connected to a surface of the blank forming assembly (6); a cutting blade (8) is fixedly connected to the surface of the blank forming assembly (6); an equipment body II (9) is fixedly connected to the sliding table module (7); a supporting rod II (10) is fixedly connected to a surface of the equipment body II (9); a blank box

(11) is fixedly connected to an inner side surface of the supporting rod II (10); a blank spool (12) is fixedly connected to a tail end of the blank strip (4);

the blank forming assembly (6) comprises an assembly shell (601), wherein an assembly body (602) is fixedly connected to the interior of the assembly shell (601), a surface of the assembly body (602) is provided with assembly pore arrays (603), a compressed air passage (605) is fixedly connected to a surface of the assembly shell (601), a compressed air connector (604) is fixedly connected to the compressed air passage (605), and a rotating mechanism (606) is fixedly connected to a surface of the compressed air passage (605);

the guide groove (5) is mounted at a tail of a left surface of the blank strip (4), and is on a same horizontal line as the blank forming assembly (6);

the blank forming assembly (6) is mounted at the tail of the left surface of the blank strip (4), and is on the same horizontal line as the blank spool (12); and the sliding table module (7) comprises a sliding sleeve module (701), wherein a sliding table base (702) is fixedly connected to a surface of the sliding sleeve module (701), and a sliding table motor (703) is fixedly connected to a surface of the sliding table base (702).

2. The automatic forming device for the rubber sealing ring blank according to claim 1, wherein the supporting rod I (2) and the supporting rod II (10) are identical in appearance, size and length, and meanwhile, the blank box (11) is located between an inner side surface of the supporting rod I (2) and the inner side surface of the supporting rod II (10).

3. The automatic forming device for the rubber sealing ring blank according to claim 1, wherein a number of the guide wheels (3) is four, which are respectively located on upper and lower sides of the left end surface of the blank strip (4), with the number of guide wheels (3) on each side being equal.

4. The automatic forming device for the rubber sealing ring blank according to claim 1, wherein an opening diameter of the blank box (11) is less than a spacing between the supporting rod I (2) and the blank spool (12).

5. The automatic forming device for the rubber sealing ring blank according to claim 1, wherein the assembly pore arrays (603) are distributed at equal intervals on the surface of the assembly body (602), and are only located in a middle position of the surface of the assembly body (602).

6. The automatic forming device for the rubber sealing ring blank according to claim 1, wherein the sliding sleeve module (701) is mounted on a tail end of a right surface of the rotating mechanism (606), while the sliding sleeve module (701) is in clamping connection to the outside of the right surface of the rotating mechanism (606).

\* \* \* \* \*